(12) United States Patent
Ashcraft

(10) Patent No.: US 9,801,353 B2
(45) Date of Patent: Oct. 31, 2017

(54) CATTLE IMMOBILIZATION APPARATUS

(71) Applicant: David Ashcraft, Twin Bridges, MT (US)

(72) Inventor: David Ashcraft, Twin Bridges, MT (US)

(\*) Notice: Subject to any disclaimer, the term of this patent is extended or adjusted under 35 U.S.C. 154(b) by 228 days.

(21) Appl. No.: 14/965,690

(22) Filed: Dec. 10, 2015

(65) Prior Publication Data
US 2017/0164578 A1    Jun. 15, 2017

(51) Int. Cl.
*A01K 15/04*    (2006.01)
*A01K 1/06*    (2006.01)

(52) U.S. Cl.
CPC .................................. *A01K 1/0606* (2013.01)

(58) Field of Classification Search
CPC ...... A01K 1/0606; A01K 1/06; A01K 1/0613; A01K 1/005; A01K 1/08; A01K 1/105
See application file for complete search history.

(56) References Cited

U.S. PATENT DOCUMENTS

| | | | | |
|---|---|---|---|---|
| 641,480 | A | * | 1/1900 | Turner ................. A01K 1/0606 119/741 |
| 2,754,803 | A | * | 7/1956 | Stammel ............. A01K 1/0606 119/741 |
| 5,178,096 | A | | 1/1993 | Lock |
| 6,112,460 | A | * | 9/2000 | Wagnitz ................... E06B 9/04 49/394 |
| 7,784,431 | B2 | | 8/2010 | Hatfield et al. |
| 2006/0174844 | A1 | | 8/2006 | Hatfield et al. |

\* cited by examiner

*Primary Examiner* — Kristen C Hayes
(74) *Attorney, Agent, or Firm* — Antoinette M. Tease

(57) ABSTRACT

An apparatus for immobilizing cattle with a horizontally oriented inside ladder and a horizontally oriented outside ladder that is parallel to the inside ladder. The inside ladder is configured to slide laterally relative to the outside ladder. The top rail of the inside ladder is parallel to and spaced apart from the top rail of the outside ladder, and the bottom rail of the inside ladder is parallel to and spaced apart from the bottom rail of the outside ladder. The inside and outside ladders each comprises a plurality of vertically oriented, equally spaced rods that extend from the top rail to the bottom rail. The proximal end of the inside ladder is attached to a hydraulic cylinder that slides the inside ladder laterally relative to the outside ladder.

9 Claims, 13 Drawing Sheets

CATTLE IMMOBILIZATION APPARATUS

BACKGROUND OF THE INVENTION

1. Field of the Invention

The present invention relates generally to the field of livestock feeding apparatuses, and more specifically, to an apparatus that immobilizes cattle for feeding purposes.

2. Description of the Related Art

Conventional head chutes suffer from the disadvantage of having to run each animal through the chute individually. The animals have to be gathered, brought into the facility where the chute is located, sorted if necessary, and then run through and caught in the chute one at a time. This procedure can be time-consuming, especially if there is a large number of animals that need to be processed.

Furthermore, conventional chutes subject the animals to a great deal of stress. This stress is partially the result of being moved from their current location into the facility where the chute is located. This facility is usually an extremely dry and dusty corral. Stress is also caused when the animals are trapped inside the small space of a conventional chute. The animals may become scared, confused, and even angry. A common result of this stress is that the animals lose valuable weight. The trauma can also permanently alter the behavior of the animals, causing them to react with aggression toward humans and other animals. Accordingly, the traditional process for immobilizing livestock is both dangerous and ineffective.

An additional drawback of traditional immobilization techniques is that they reduce the effectiveness of the treatment being performed. For example, stress can cause a sick animal to have a poorer immune response to a therapeutic treatment; ultimately, the stress may result in death or prolonged illness in severe cases. When cattle are artificially inseminated, the stress caused by handling plays a significant role in determining whether conception is achieved. Current artificial insemination operations involved individual handling through alleys, chutes and head-catches, all of which cause undue stress on a female bovine at the most critical point in the breeding process.

Another limitation of conventional livestock chutes is the extra labor that is required to perform the operation. For example, it may take up to four ranch hands to perform a given procedure on 400 cattle using a conventional chute; this is because, as noted above, the cattle must be rounded up and moved to the facility, sorted, and loaded into the chute before the procedure can begin. Once the procedure has been completed, the cattle have to once again be moved back to their original location. All of this is time-consuming and labor-intensive.

The present invention aims to eliminate the level of stress imposed upon livestock when they are immobilized, thereby achieving higher conception rates and a less miserable experience for both the animal and the operator. The present invention also requires less labor to manipulate the cattle and perform the requisite procedure, resulting in overall cost savings. Finally, the present invention improves safety for both personnel and livestock.

Examples of inventions designed to immobilize livestock include: U.S. Pat. No. 641,480 (Turner), which discloses a multiple-cattle stanchion with a common operating bar that simultaneously opens and closes all of the stanchions; U.S. Pat. No. 2,754,803 (Stammel, 1954), which discloses a feeding gate with a first set of vertically disposed and immovable rods and a second set of vertically disposed and movable rods that are configured to move horizontally relative to the first set of rods; U.S. Pat. No. 5,178,096 (Lock, 1993), which discloses a livestock handling/feeding apparatus with a plurality of stanchions, each stanchion comprising a second sidebar that is parallel to a first sidebar in a first configuration and that pivots in a vertically oriented plane relative to a pivot support in a second configuration to increase or decrease the space through which the cattle insert their heads; and U.S. Pat. No. 7,784,431 (Hatfield et al., 2010), which discloses an assembly of animal stanchions that includes fixed stanchions and pivoting stanchions that are spaced laterally apart from the fixed stanchions and that fall into an open position when released from a latching mechanism.

BRIEF SUMMARY OF THE INVENTION

The present invention is an apparatus for immobilizing cattle comprising: a horizontally oriented inside ladder; and a horizontally oriented outside ladder that is parallel to the inside ladder; wherein the inside ladder is configured to slide laterally relative to the outside ladder; wherein each of the inside ladder and the outside ladder comprises a top rail and a bottom rail, the top rail of the inside ladder being parallel to and spaced apart from the top rail of the outside ladder, and the bottom rail of the inside ladder being parallel to and spaced apart from the bottom rail of the outside ladder; wherein the inside ladder comprises a plurality of vertically oriented rods that extend from the top rail of the inside ladder to the bottom rail of the inside ladder, and the outside ladder comprises a plurality of vertically oriented rods that extend from the top rail of the outside ladder to the bottom rail of the outside ladder; wherein the plurality of vertically oriented rods of the inside ladder are spaced equally apart from one another across an entire length of the inside ladder, and wherein the plurality of vertically oriented rods of the outside ladder are spaced equally apart from one another across an entire length of the outside ladder; wherein each of the plurality of vertically oriented rods of the inside ladder has a central axis, each of the plurality of vertically oriented rods of the outside ladder has a central axis, and the distance between the central axes of each adjacent rod on the inside ladder is equal to the distance between the central axes of each adjacent rod on the outside ladder; wherein the inside ladder has a proximal end, and the proximal end of the inside ladder is attached to a hydraulic cylinder that slides the inside ladder laterally relative to the outside ladder; and wherein the central axes of the vertically oriented rods of the inside ladder are vertically aligned with the vertically oriented rods of the outside ladder.

In a preferred embodiment, the top and bottom rails of the inside and outside ladders are hollow, and wherein the vertically oriented rods of the inside and outside ladders are hollow. Preferably, each of the vertically oriented rods of the inside ladder has an outside diameter, and the outside diameters of the vertically oriented rods of the inside ladder are equal to one another; each of the vertically oriented rods of the outside ladder has an outside diameter, and the outside diameters of the vertically oriented rods of the inside ladder are equal to one another; and the outside diameter of the vertically oriented rods on the inside ladder is less than the outside diameter of the vertically oriented rods on the outside ladder.

In a preferred embodiment, the outside ladder has a proximal end and a terminal end, and the proximal end and the terminal end of the outside ladder are configured for attachment to existing fence posts. Preferably, both the outside ladder and the inside ladder are mounted inside of the existing fence posts. The bottom rails of the outside and inside ladders are preferably situated proximate to and above a top edge of an outside wall of a feeding trough.

In a preferred embodiment, the top rail of the inside ladder is secured to the top rail of the outside ladder via a plurality of evenly spaced upper sleeves that are attached to and extend inwardly from an inside surface of the top rail of the outside ladder; the bottom rail of the inside ladder is secured to the bottom rail of the outside ladder via a plurality of evenly spaced lower sleeves that are attached to and extend inwardly from an inside surface of the bottom rail of the outside ladder; and the top rail of the inside ladder extends slidably through the upper sleeves, and the bottom rail of the inside ladder extends slidably through the lower sleeves.

In a preferred embodiment, the invention further comprises an upper diagonal support member and a lower diagonal support member, wherein a first end of the upper diagonal support member is attached to a top end of a proximal-most vertically oriented rod of the outside ladder, a first end of the lower diagonal support member is attached to a bottom end of the proximal-most vertically oriented rod of the outside ladder, and a first end of a horizontal post is attached to a vertical center of the proximal-most vertically oriented rod of the outside ladder; wherein the hydraulic cylinder is attached to the horizontal post by a bracket, the horizontal post extending horizontally from the vertical center of the proximal-most vertically oriented rod of the outside ladder; and wherein a second end of the upper diagonal support member and a second end of the lower diagonal support member are attached to the horizontal post at a point proximate to the bracket that attaches the hydraulic cylinder to the horizontal post. In one embodiment, the apparatus is configured in a series of individual modular components.

REFERENCE NUMBERS

Figure 1:
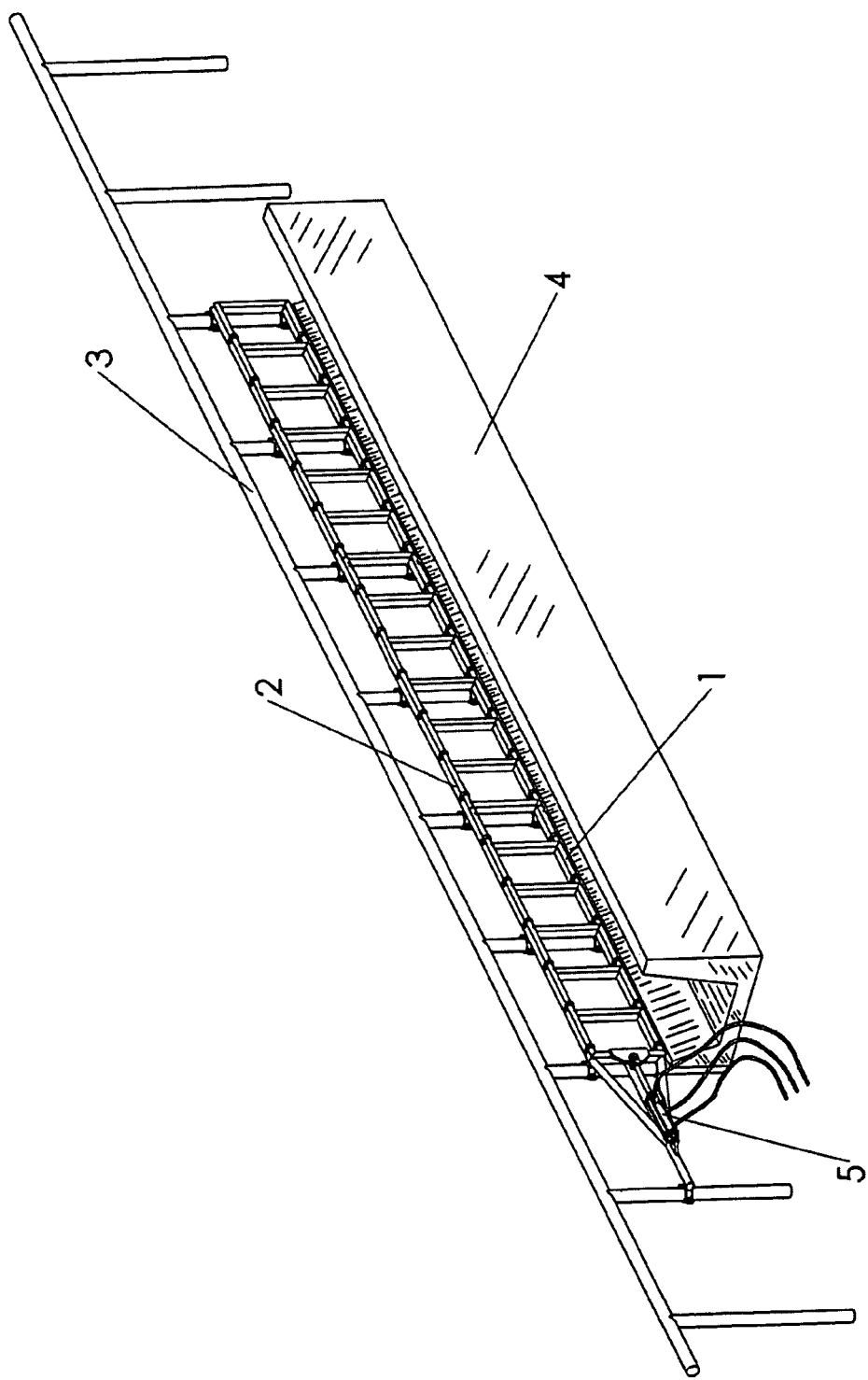
FIG. 1 is a front perspective view of the present invention.

1 Inside ladder
1a Top rail (of inside ladder)
1b Bottom rail (of inside ladder)
1c Vertically oriented rod (of inside ladder)
1d Internal sleeve (of top rail of inside ladder)
2 Outside ladder
2a Top rail (of outside ladder)
2b Bottom rail (of outside ladder)
2c Vertically oriented rod (of outside ladder)
2d Internal sleeve (of top rail of outside ladder)
3 Fence
4 Feeding trough
5 Hydraulic cylinder
6 Pressure relief valve
7 First bracket
8 Upper collar
9 Lower collar
10 Horizontal post
11 Second bracket
12 Collar
13 Upper sleeve
14 Lower sleeve
15 Upper diagonal support member
16 Lower diagonal support member
17 Bolt hole

DETAILED DESCRIPTION OF INVENTION

The present invention overcomes the limitations of conventional animal chutes by providing a head-catch that is built into a continuous feed bunk. In one embodiment, the apparatus is a single, continuous feed bunk. In an alternate embodiment, it is a modular feed bunk that is joined together in sections. The present invention enables the livestock producer to capture the animals individually and simultaneously as they reach through the feed bunk to eat their morning or evening meal. The invention is described more fully below in reference to the figures.

FIG. 1 is a front perspective view of the present invention. As shown in this figure, the present invention comprises an inside ladder 1 and an outside ladder 2, both of which are parallel to one another, the inside ladder 1 being configured to slide laterally relative to the outside ladder 2. Each of the inside ladder 1 and outside ladder 2 comprises a top rail and a bottom rail, which are parallel to and spaced apart from one another. The top and bottom rails of the inside and outside ladders are oriented so that they extend horizontally across the length of the apparatus. Each of the inside and outside ladders also comprises a plurality of vertically oriented rods or posts that extend from the top rail to the bottom rail and across the entire length of the apparatus. The plurality of vertically oriented rods or posts are spaced equally apart from one another across the length of the apparatus, and the distance between the central axes of each adjacent rod or post on the inside ladder is equal to the distance between the central axes of each adjacent rod or post on the outside ladder. In a preferred embodiment, the distance between the top and bottom rails is twenty inches, and the distance between the central axes of each adjacent rod or post is eighteen inches.

The top and bottom rails on both the inside and outside ladders are preferably hollow, as are the vertically oriented rods. In a preferred embodiment, the top and bottom rails and vertically oriented rods of the inside and outside ladders are comprised of steel tubing or pipe. The outside diameter of each of the vertically oriented rods on the outside ladder is the same, as is the outside diameter of each of the vertically oriented rods on the inside ladder; however, in a preferred embodiment, the outside diameter of the vertically oriented rods on the inside ladder is less than the outside diameter of the vertically oriented rods on the outside ladder. This reason for this difference in outside diameter is to lessen the weight that must be pulled by the hydraulic cylinder, which causes the inside ladder to slide horizontally relative to the outside ladder. The outside ladder, on the other hand, is stationary.

As shown in FIG. 1, the apparatus is preferably mounted to an existing fence 3 (not part of the present invention). When installed, the bottom rails of the outside and inside ladders are situated proximate to and above the top edge of the outside wall of a feeding trough 4 (also not part of the present invention). Note that "outside" in this context means the side from which the cattle would be approaching the trough to feed. The apparatus comprises a proximal end, to which a hydraulic cylinder 5 is attached, and a distal end, which constitutes the terminus of the apparatus. The hydraulic cylinder is shown in greater detail in subsequent figures.

Figure 2:
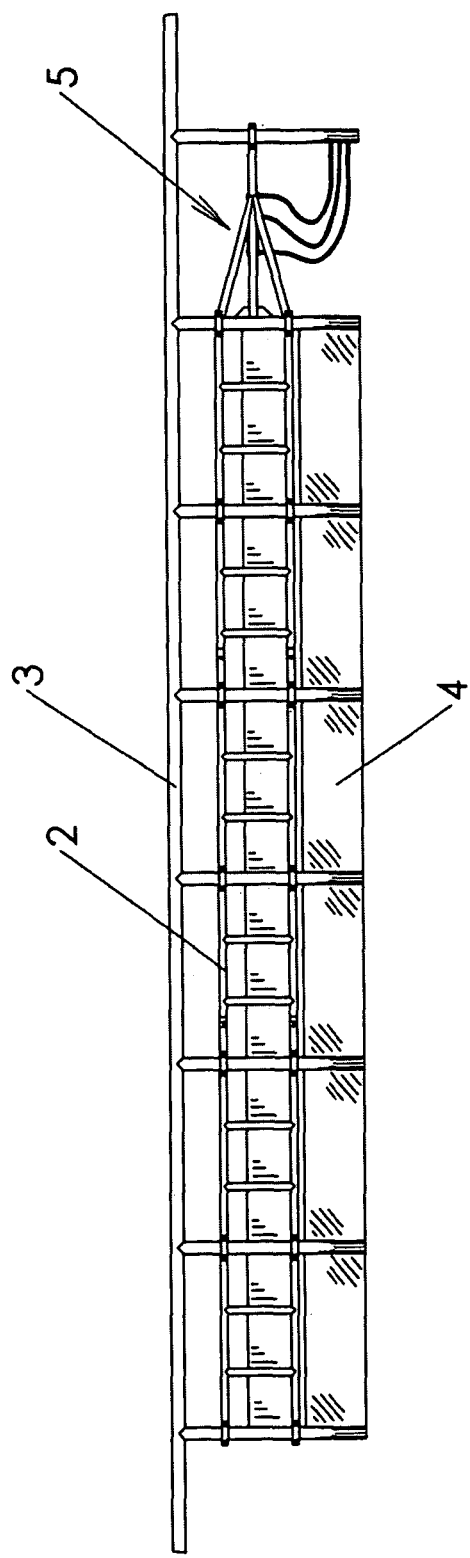
FIG. 2 is a rear view of the present invention.

FIG. 2 is a rear view of the present invention. In this view and the view shown in FIG. 1, the vertically oriented rods of the inside ladder are vertically aligned with the vertically oriented rods of the outside ladder 2 (i.e., their central axes are aligned). For this reason, the inside ladder 1 is not visible from the vantage point of FIG. 2. This is the position in which the inside ladder 1 would be relative to the outside ladder 3 once the cattle have been released from the immobilization apparatus.

Figure 3:
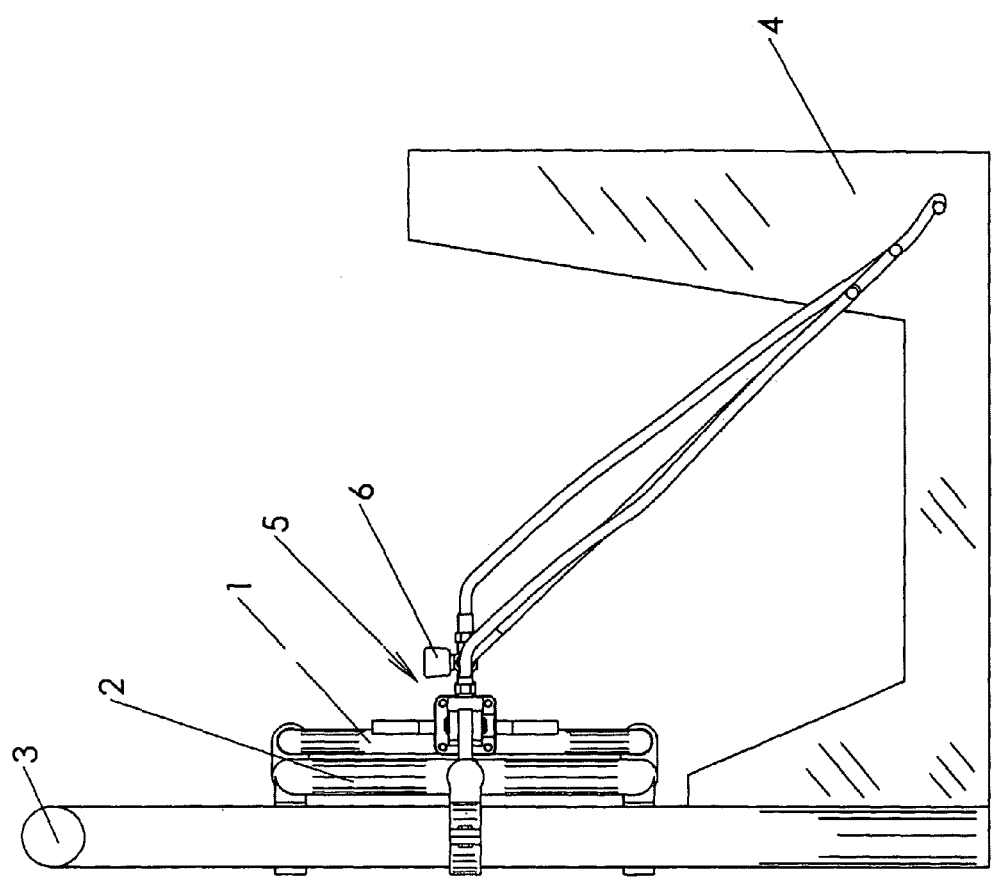
FIG. 3 is a first side (end) view of the present invention.

FIG. 3 is a first side (end) view of the present invention. This figure shows the proximal-most vertically oriented rods of both the inside ladder 1 and the outside ladder 2. It also shows that the outside circumference of the vertically oriented rod on the outside ladder is greater than the outside circumference of the vertically oriented rod on the inside ladder. This figure also shows the positioning of the inside and outside ladders 1, 2 relative to the top edge of the outside wall of the feeding trough; as noted above, the bottom rails of both the inside and outside ladders are situated proximate to and just above the top edge of the outside wall of the feeding trough. This is so that when cattle put their heads through the apertures in the ladders (through the outside ladder first and then the inside ladder), they can access the food in the trough.

As shown in FIGS. 1 and 3, the hydraulic cylinder extends horizontally, parallel with the top and bottom rails of the inside and outside ladders, and is attached to the inside ladder 1 via a first bracket 7 (see FIG. 4) that is centered on the proximal-most vertically oriented rod of the inside ladder. The hydraulic cylinder preferably comprises a pressure relief valve 6, which prevents the apparatus from injuring the cattle by exerting too much pressure on their necks. Although not shown, the hydraulic cylinder is preferably connected to a tractor or an electric or gas motor that supplies power to the hydraulic cylinder.

Figure 4:
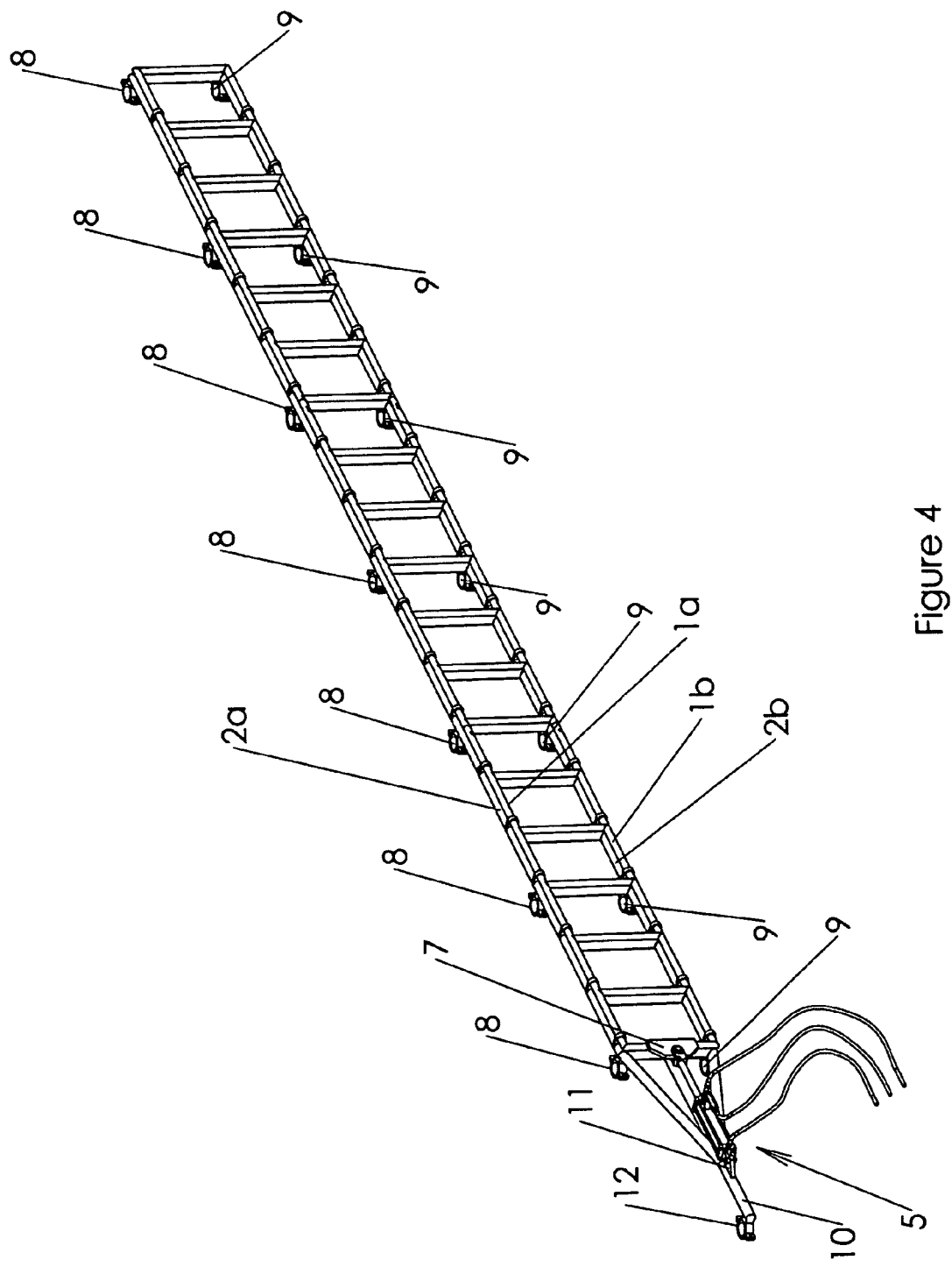
FIG. 4 is a front perspective view of the present invention shown without the fence or feed trough.

FIG. 4 is a front perspective view of the present invention shown without the fence or feed trough. In this figure, the top rail 1a and bottom rail 1b of the inside ladder 1 are labelled, as are the top rail 2a and bottom rail 2b of the outside ladder. In one embodiment, the outside ladder 2 is secured to the fence 3 (not shown) via a plurality of upper collars 8 and lower collars 9 that are spaced apart from one another on the outside surface of the top rail 2a and bottom rail 2b of the outside ladder, respectively, and that extend outwardly from the top and bottom rails 2a, 2b. The present invention is not limited to any particular manner of securing the outside ladder 2 to the fence 3, however; for example, the outside ladder may be secured to the fence with clips or welded to the fence. An important aspect of the present invention is that both the outside and inside ladders are mounted on the inside of the fence posts; this ensures that if the cattle are locked into the apparatus and pull outward (i.e., to get out of the apparatus), they will be pulling against the fence posts and not pulling the outside ladder away from the inside ladder. Note that the hydraulic cylinder 5 is supported by a horizontal post 10 via a second bracket 11. The horizontal post 10 is secured to an existing fence or gate post (not shown) via a collar 12 or other means (for example, clip or weld) for securing the horizontal post to the fence gate post.

Figure 5:
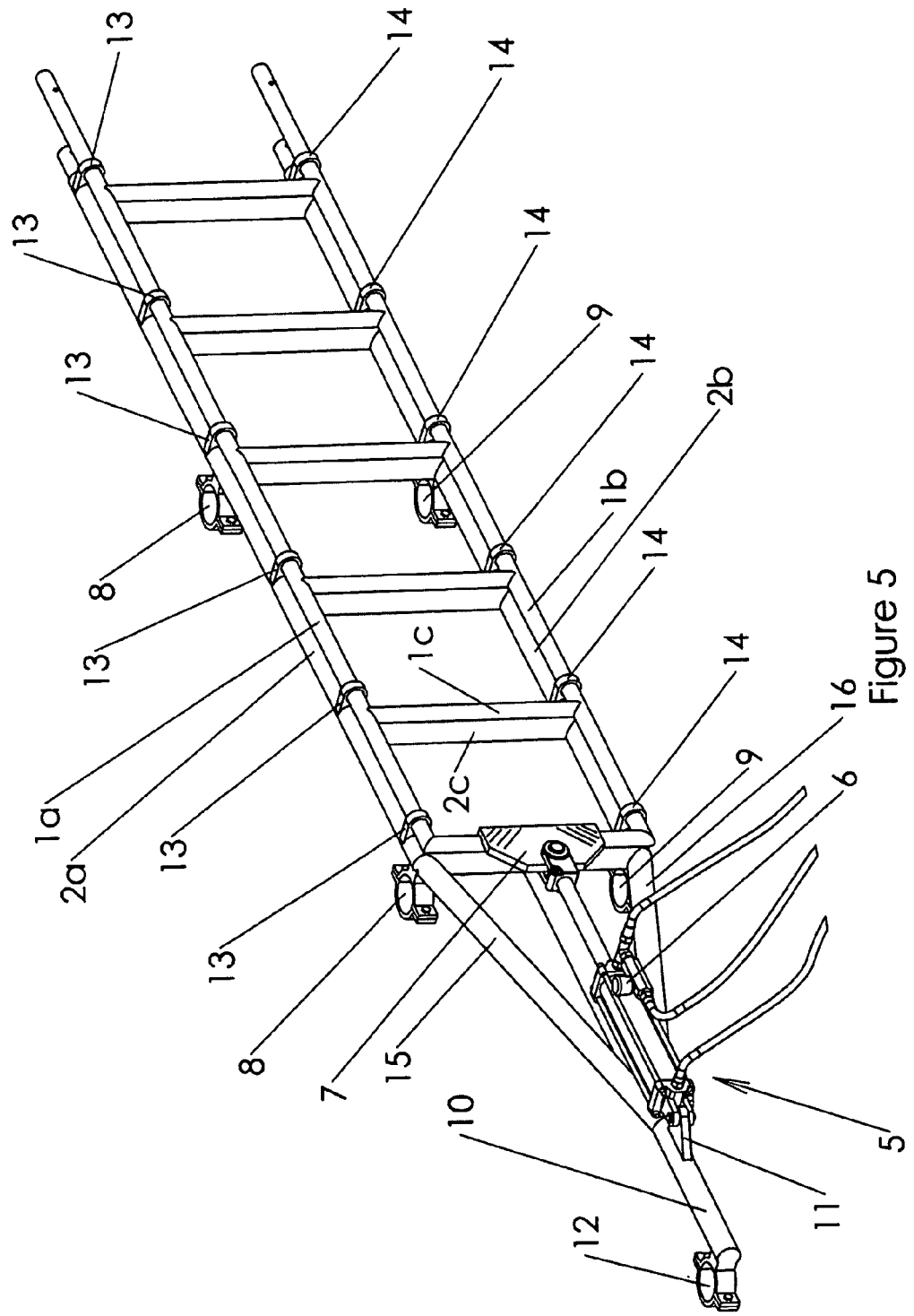
FIG. 5 is a detail perspective view of the power end of the present invention.

FIG. 5 is a detail perspective view of the power end of the present invention. The "power end" of the invention is also referred to as the "proximal end." As shown in this figure, the top rail 1a of the inside ladder is secured to the top rail 2a of the outside ladder via a plurality of evenly spaced upper sleeves 13 that are attached to and extend inwardly from the inside surface of the top rail 2a of the outside ladder. Similarly, the bottom rail 1b of the inside ladder is secured to the bottom rail 1b of the outside ladder via a plurality of evenly spaced lower sleeves 14 that are attached to and extend inwardly from the inside surface of the bottom rail 2b of the outside ladder. The top rail 1a of the inside ladder extends slidably through the upper sleeves 13, and the bottom rail b of the inside ladder extends slidably through the lower sleeves 14. In this manner, the inside ladder 1 is able to slide horizontally relative to the outside ladder when the hydraulic cylinder 4 is extended or retracted. In FIG. 5, the hydraulic cylinder 5 is fully extended, and the vertically oriented rods is of the inside ladder are aligned with the vertically oriented rods 2c of the outside ladder.

In a preferred embodiment, in addition to the horizontal post 10, which extends horizontally from the vertical center of the proximal-most vertically oriented rod 2c of the outside ladder, the invention further comprises an upper diagonal support member 15 and a lower diagonal support member 16. A first end of the upper diagonal support member 15 is attached to the top end of the proximal-most vertically oriented rod 2c of the outside ladder, and a first end of the lower diagonal support member 16 is attached to the bottom end of the proximal-most vertically oriented rod 2c of the outside ladder. A second end of the upper diagonal support member 15 and a second end of the lower diagonal support member 16 are attached to the horizontal post 10 at a point that corresponds approximately to the proximal end of the second bracket 11. This particular three-pronged configuration—namely, the horizontal post 10, upper diagonal support member 15 and lower diagonal support member 16—ensures that the hydraulic cylinder 5 is pulling evenly on the inside ladder and also provides a counterpoint to the force being exerted on the inside ladder by the hydraulic cylinder.

Figure 6:
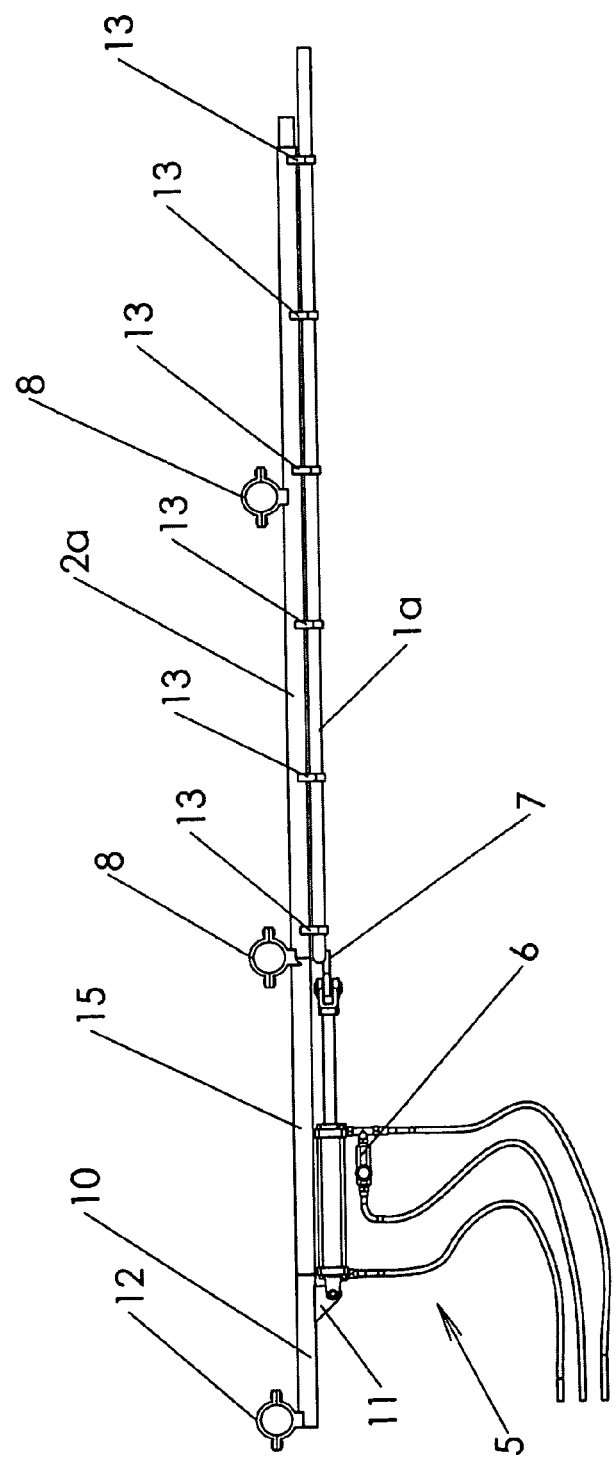
FIG. 6 is a top view of the power end of the present invention.

FIG. 6 is a top view of the power end of the present invention. The present invention is not limited to any particular size of the hydraulic cylinder 5. Rather, the size of the hydraulic cylinder may be selected to accommodate the length of the apparatus. For example, if the apparatus is 200 feet long, a larger hydraulic cylinder may be desired than if the apparatus were 50 feet long.

Figure 7:
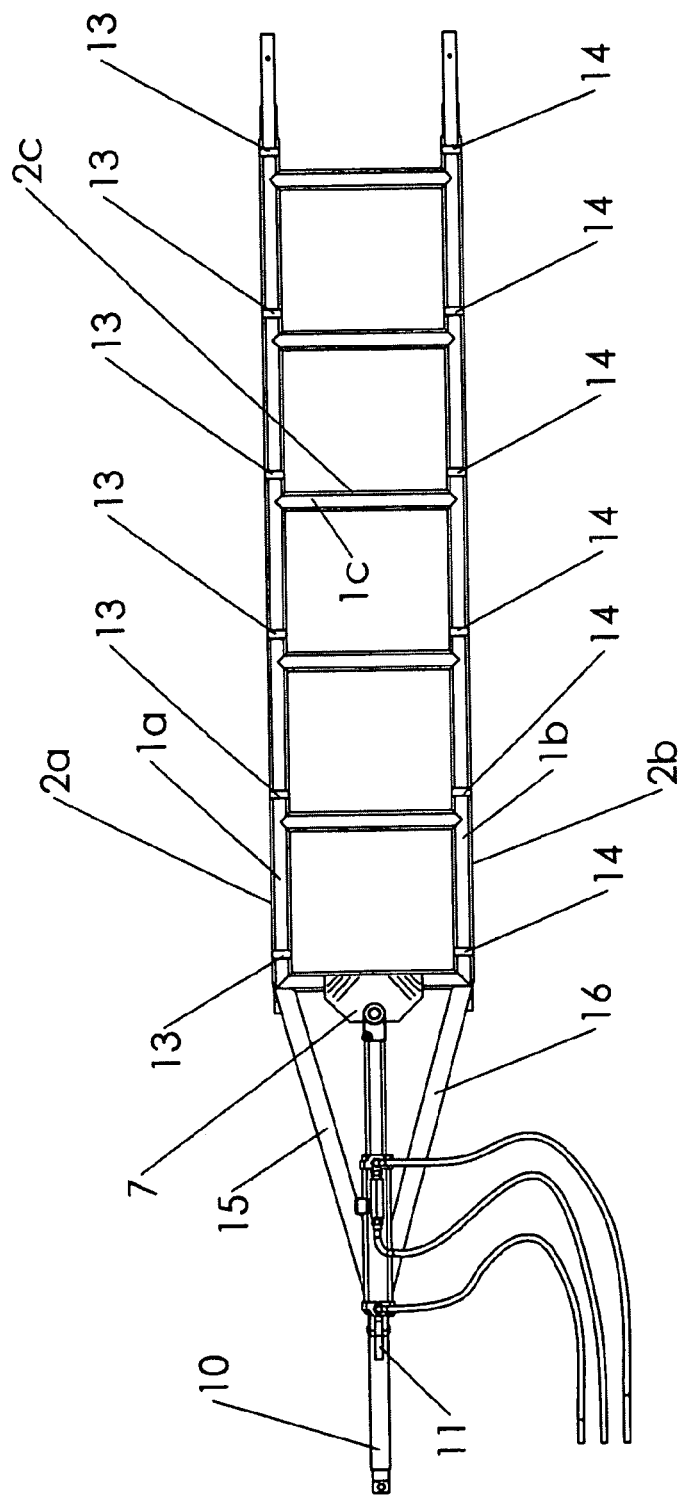
FIG. 7 is a front view of the power end of the present invention shown with the apparatus in a fully open position.

FIG. 7 is a front view of the power end of the present invention shown with the apparatus in a fully open position. In this figure, the invention is in the same position as that shown in FIGS. 1-6; that is, the hydraulic cylinder 5 is fully extended, and the vertically oriented rods 1c of the inside ladder are aligned with the vertically oriented rods 2c of the outside ladder.

Figure 8:
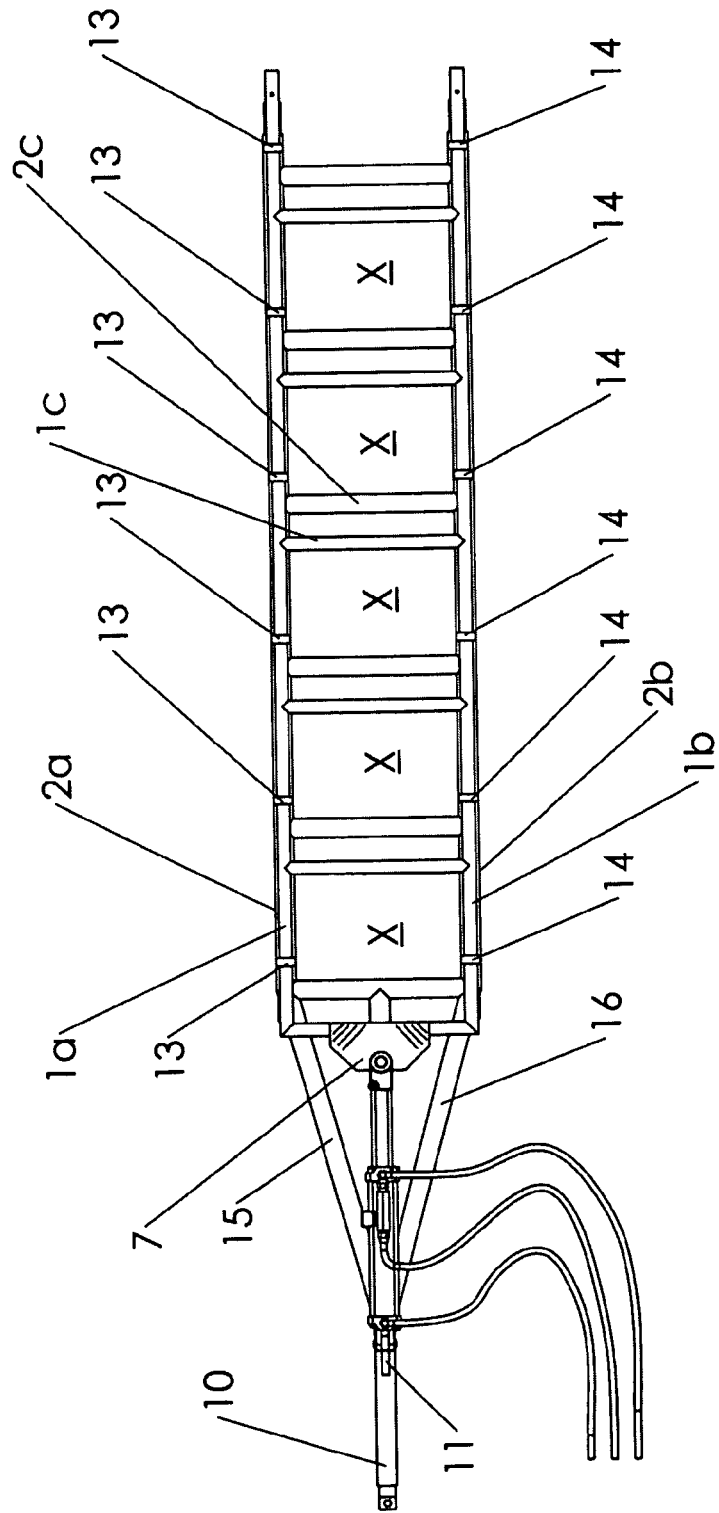
FIG. 8 is a front view of the power end of the present invention shown with the apparatus in a partially closed position.

FIG. 8 is a front view of the power end of the present invention shown with the apparatus in a partially closed position. In this figure, the hydraulic cylinder 5 has been partially retracted so that the inside ladder 1 has slid to the left relative to the outside ladder 2. This is the position in which the apparatus would be prior to feeding the cattle. As the vertically oriented rods 1c of the inside ladder move left relative to the vertically oriented rods 2c of the outside ladder, the space (designated with an "X" in FIG. 8) through which the cattle insert their heads is decreased. Typically, the operator would close this space to some degree (as shown in FIG. 8) before feeding the cattle to prevent more than one animal from placing its head in the same space.

Figure 9:
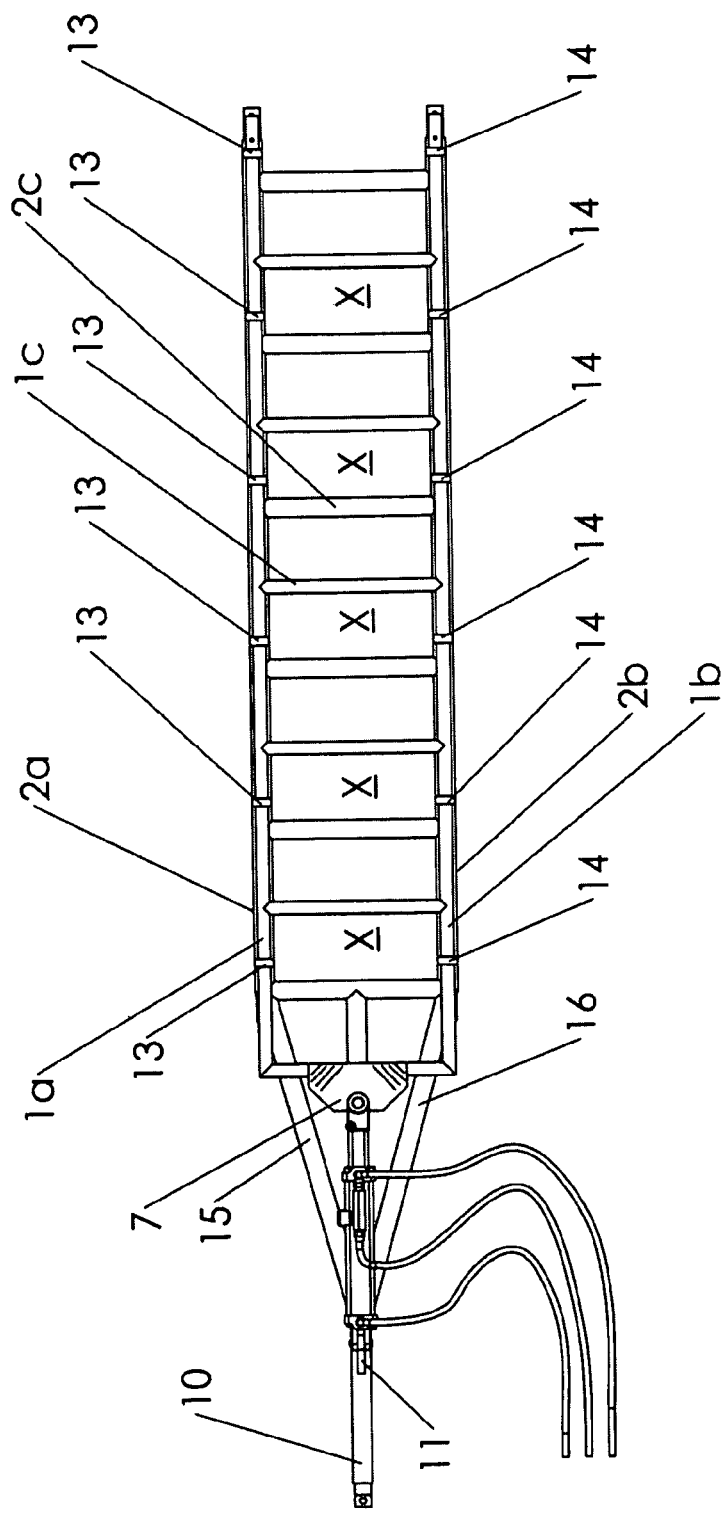
FIG. 9 is a front view of the power end of the present invention shown with the apparatus in a fully closed position.

FIG. 9 is a front view of the power end of the present invention shown with the apparatus in a fully closed position. In this figure, the hydraulic cylinder has now been fully retracted, and the spaces (designated with an "X") through which the cattle insert their heads have now been decreased to their maximum extent. The width of this space can be adjusted by adjusting the throw of the hydraulic cylinder and is ideally sufficient to hold the neck of an animal without allowing the animal to pull its head back through the apparatus.

Figure 10:
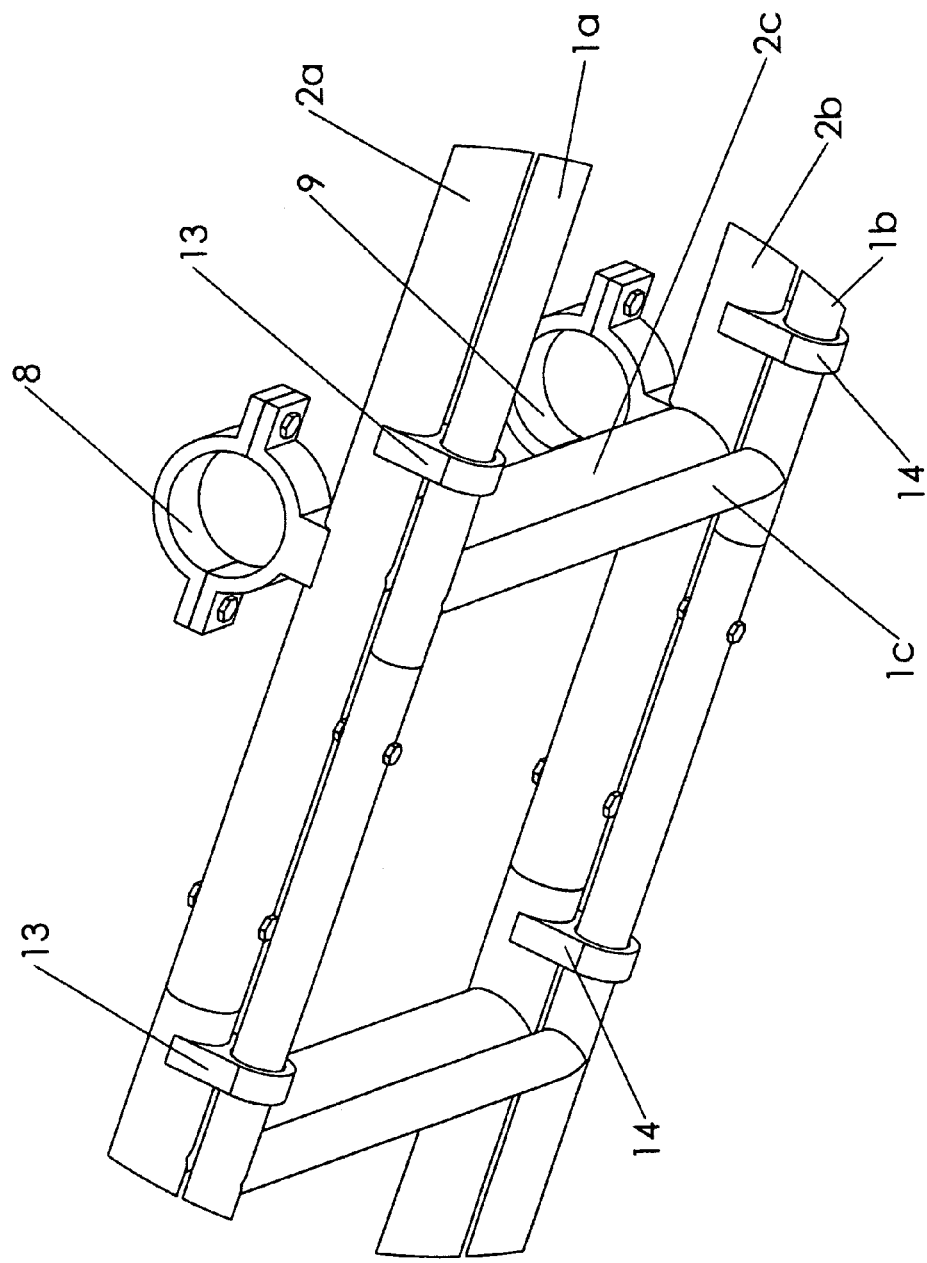
FIG. 10 is a top perspective view of the modular connection of the present invention shown with the two modular components attached to one another.

FIG. 10 is a top perspective view of the modular connection of the present invention shown with the two modular components attached to one another. In the embodiment shown in FIG. 10-13, the apparatus is configured in a series of individual modular components.

Figure 11:
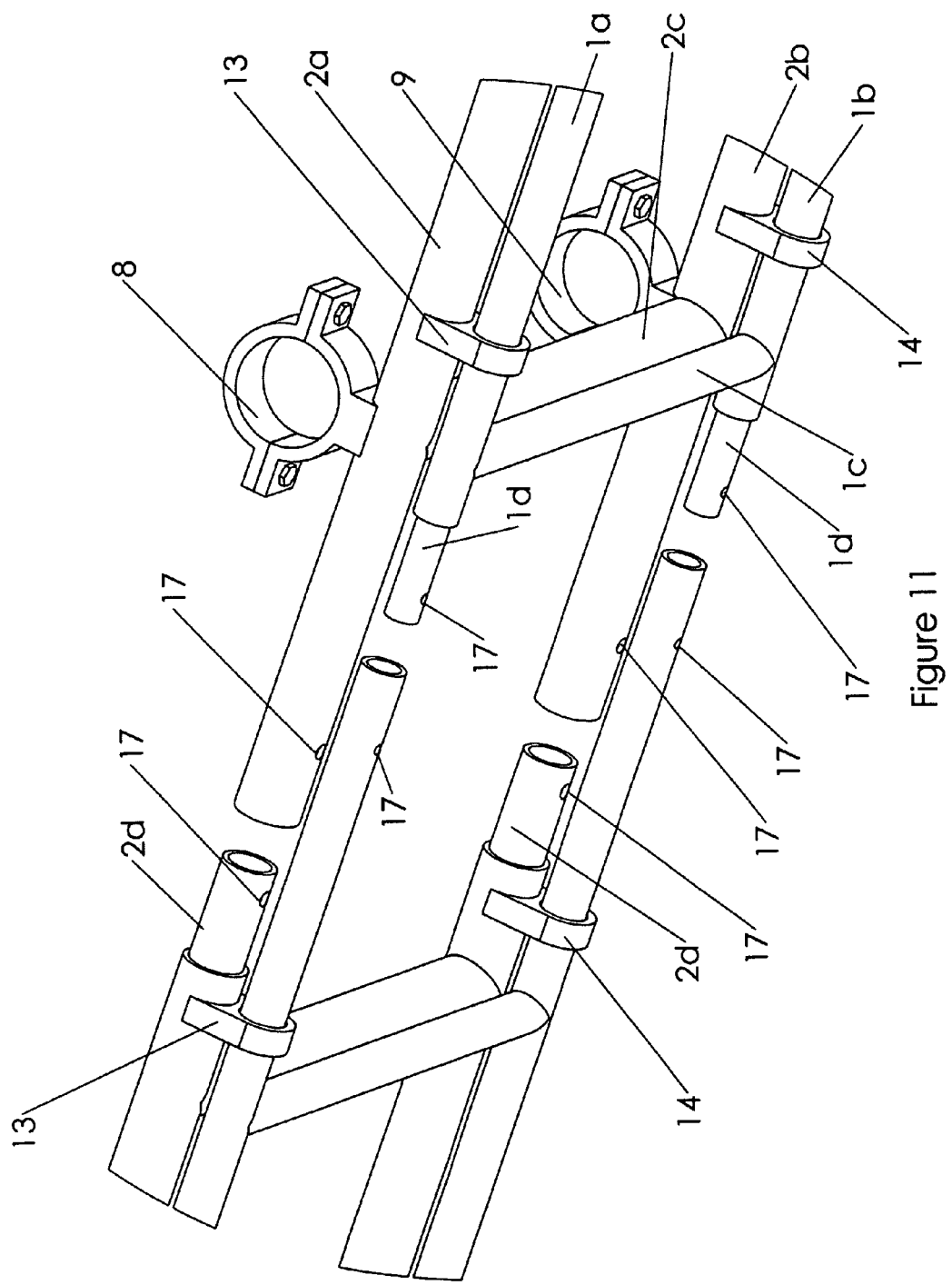
FIG. 11 is a top perspective view of the modular connection of the present invention shown with the two modular components detached from one another.
Figure 12:
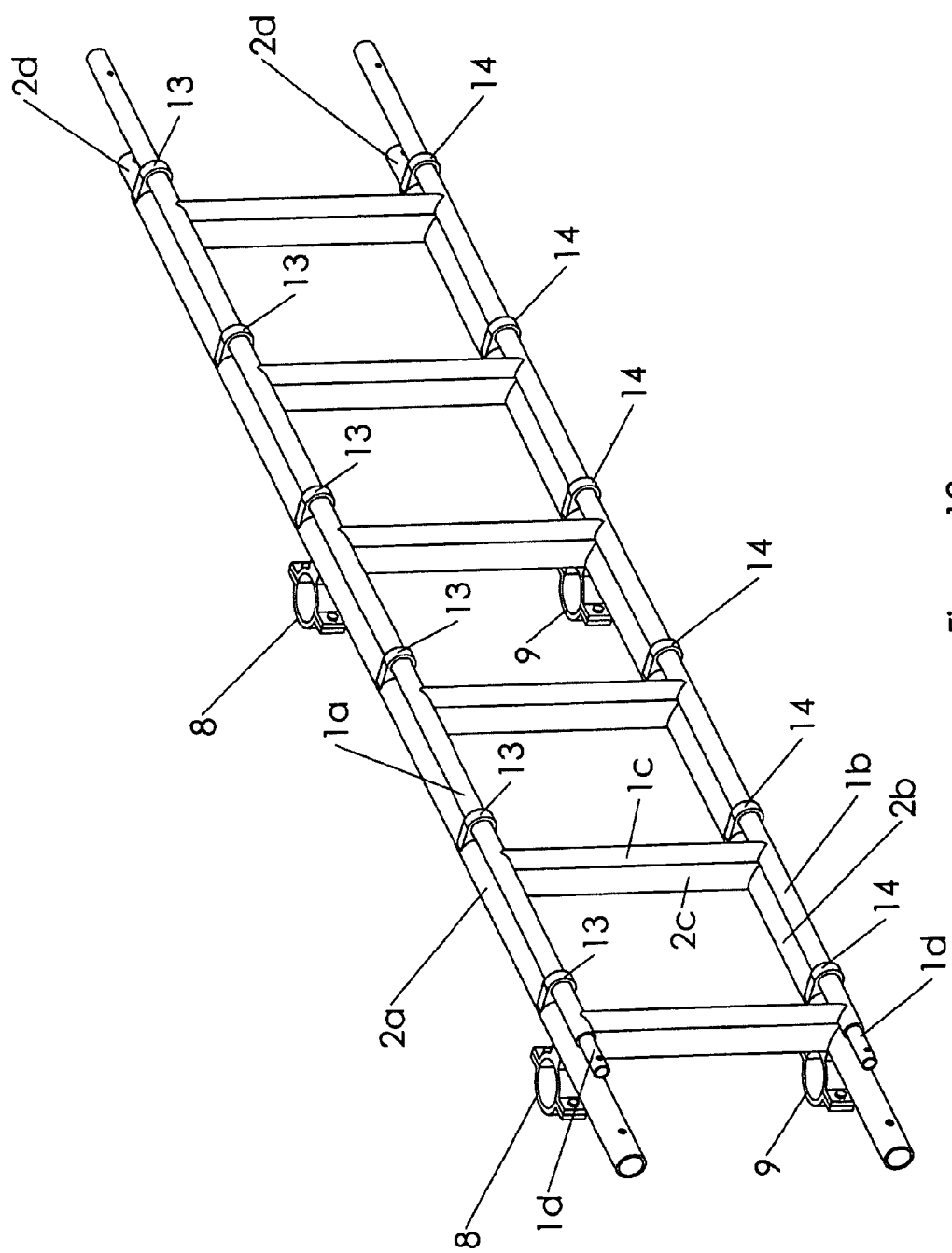
FIG. 12 is a front perspective view of a middle modular component of the present invention.
Figure 13:
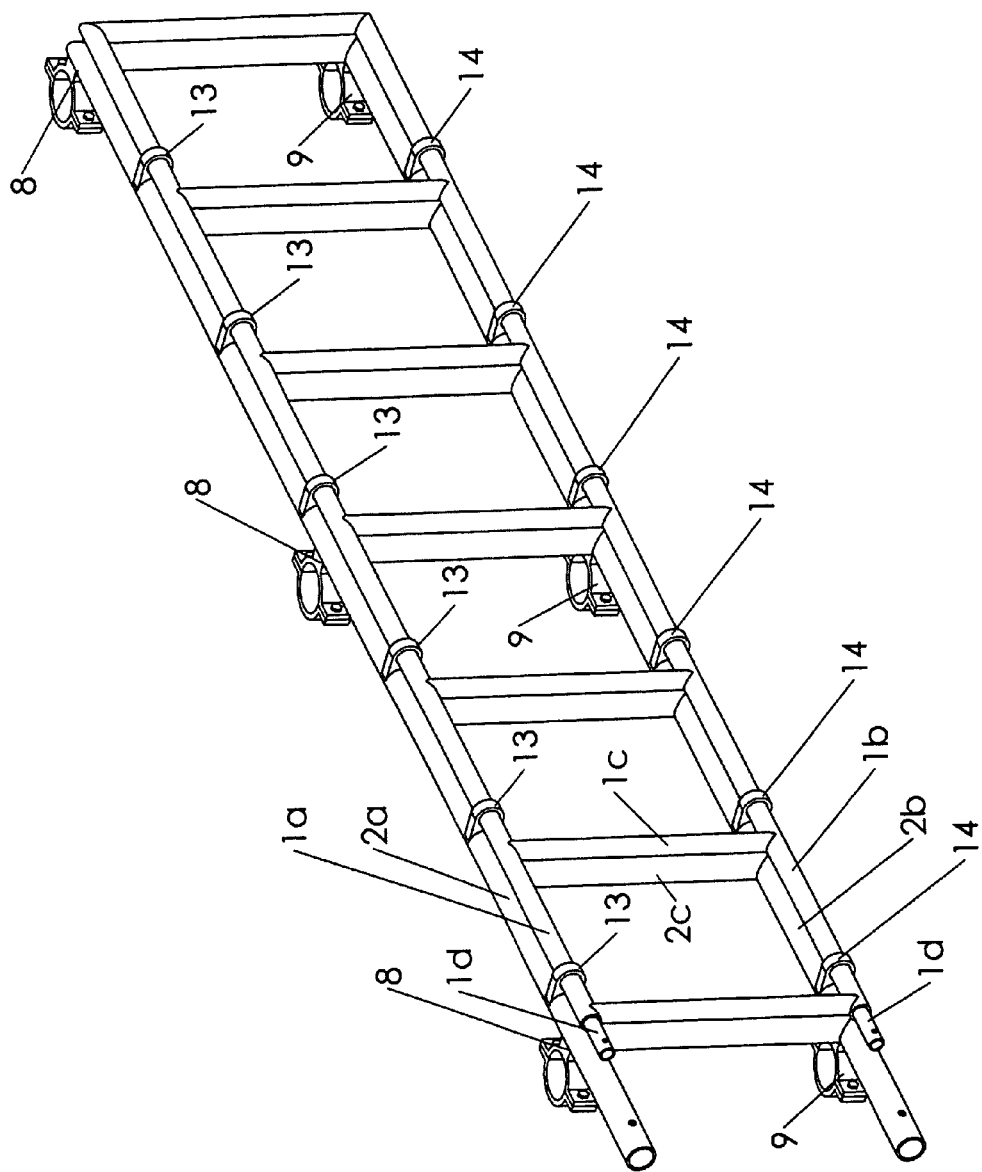
FIG. 13 is a front perspective view of a terminal modular component of the present invention.

FIG. 11 is a top perspective view of the modular connection of the present invention shown with the two modular components detached from one another. In this embodiment, the top rail 1a of the inside ladder and the top rail 2a of the outside ladder each comprises an internal sleeve 1d, 2d that forms a male part that fits into an open end of the top rail 1a, 2a (which acts as the female part) and is secured therein with a bolt (not shown) via bolt holes 17. Similarly, the bottom rail 1b of the inside ladder and the bottom rail 2b of the outside ladder each comprises an internal sleeve 1d, 2d that forms a male part that fits into an open end of the bottom rail 1b, 2b (which acts as the female part) and is secured therein with a bolt (not shown) via bolt holes 17. This embodiment allows the ranch owner or feedlot operator to purchase the present invention in whatever length is desired. In a preferred embodiment, the invention is sold in modular components that are ten feet long, with a middle section (shown in FIG. 11), a terminal section (shown in FIG. 12), and a proximal section (shown in FIGS. 5-9). Note that the non-modular embodiment of the present invention is shown in FIGS. 1, 2 and 4.

Now that the present invention has been fully described, it should be apparent that one of the advantages of the present invention is that it maintains a large number of cattle in a side-by-side configuration in which the animals cannot move sideways or up and down by virtue of the immobilization of their heads within the dual ladders of the present invention. Moreover, the animals are immobilized with their rear ends all facing in the same direction, which facilitate procedures that must be performed on that end of the animal. At the same time, the animals can eat from the feeding trough, which keeps them temporarily occupied and relatively sedate.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. An apparatus for immobilizing cattle comprising:
   (a) a horizontally oriented inside ladder; and
   (b) a horizontally oriented outside ladder that is parallel to the inside ladder;
   wherein the inside ladder is configured to slide laterally relative to the outside ladder;
   wherein each of the inside ladder and the outside ladder comprises a top rail and a bottom rail, the top rail of the inside ladder being parallel to and spaced apart from the top rail of the outside ladder, and the bottom rail of the inside ladder being parallel to and spaced apart from the bottom rail of the outside ladder;
   wherein the inside ladder comprises a plurality of vertically oriented rods that extend from the top rail of the inside ladder to the bottom rail of the inside ladder, and the outside ladder comprises a plurality of vertically oriented rods that extend from the top rail of the outside ladder to the bottom rail of the outside ladder;
   wherein the plurality of vertically oriented rods of the inside ladder are spaced equally apart from one another across an entire length of the inside ladder, and wherein the plurality of vertically oriented rods of the outside ladder are spaced equally apart from one another across an entire length of the outside ladder;
   wherein each of the plurality of vertically oriented rods of the inside ladder has a central axis, each of the plurality of vertically oriented rods of the outside ladder has a central axis, and the distance between the central axes of each adjacent rod on the inside ladder is equal to the distance between the central axes of each adjacent rod on the outside ladder;
   wherein the inside ladder has a proximal end, and the proximal end of the inside ladder is attached to a hydraulic cylinder that slides the inside ladder laterally relative to the outside ladder; and
   wherein the central axes of the vertically oriented rods of the inside ladder are vertically aligned with the vertically oriented rods of the outside ladder.

2. The apparatus of claim 1, wherein the top and bottom rails of the inside and outside ladders are hollow, and wherein the vertically oriented rods of the inside and outside ladders are hollow.

3. The apparatus of claim 1, wherein each of the vertically oriented rods of the inside ladder has an outside diameter, and the outside diameters of the vertically oriented rods of the inside ladder are equal to one another; wherein each of the vertically oriented rods of the outside ladder has an outside diameter, and the outside diameters of the vertically oriented rods of the inside ladder are equal to one another; and wherein the outside diameter of the vertically oriented rods on the inside ladder is less than the outside diameter of the vertically oriented rods on the outside ladder.

4. The apparatus of claim 1, wherein the outside ladder has a proximal end and a terminal end, and the proximal end and the terminal end of the outside ladder are configured for attachment to existing fence posts.

5. The apparatus of claim 4, wherein both the outside ladder and the inside ladder are mounted inside of existing fence posts.

6. The apparatus of claim 1, wherein the bottom rails of the outside and inside ladders are situated proximate to and above a top edge of an outside wall of a feeding trough.

7. The apparatus of claim 1, wherein the top rail of the inside ladder is secured to the top rail of the outside ladder via a plurality of evenly spaced upper sleeves that are attached to and extend inwardly from an inside surface of the top rail of the outside ladder; wherein the bottom rail of the inside ladder is secured to the bottom rail of the outside ladder via a plurality of evenly spaced lower sleeves that are attached to and extend inwardly from an inside surface of the bottom rail of the outside ladder; and wherein the top rail of the inside ladder extends slidably through the upper sleeves, and the bottom rail of the inside ladder extends slidably through the lower sleeves.

8. The apparatus of claim 1, further comprising an upper diagonal support member and a lower diagonal support member, wherein a first end of the upper diagonal support member is attached to a top end of a proximal-most vertically oriented rod of the outside ladder, a first end of the lower diagonal support member is attached to a bottom end of the proximal-most vertically oriented rod of the outside ladder, and a first end of a horizontal post is attached to a vertical center of the proximal-most vertically oriented rod of the outside ladder; wherein the hydraulic cylinder is attached to the horizontal post by a bracket, the horizontal post extending horizontally from the vertical center of the proximal-most vertically oriented rod of the outside ladder; and wherein a second end of the upper diagonal support member and a second end of the lower diagonal support member are attached to the horizontal post at a point proximate to the bracket that attaches the hydraulic cylinder to the horizontal post.

9. The apparatus of claim 1, wherein the apparatus is configured in a series of individual modular components.

* * * * *